(12) United States Patent
Khurgin et al.

(10) Patent No.: US 6,671,425 B1
(45) Date of Patent: Dec. 30, 2003

(54) METHOD AND SYSTEM FOR ACOUSTICALLY TUNING A LIGHT SOURCE

(75) Inventors: Jacob B. Khurgin, Baltimore, MD (US); Nadejda Reingand, Baltimore, MD (US); Isaac Shpantzer, Bethesda, MD (US); Israel Smilanski, Rockville, MD (US); Pak Shing Cho, Gaithersburg, MD (US)

(73) Assignee: CeLight, Silver Spring, MD (US)

( * ) Notice: Subject to any disclaimer, the term of this patent is extended or adjusted under 35 U.S.C. 154(b) by 21 days.

(21) Appl. No.: 10/173,581

(22) Filed: Jun. 18, 2002

(51) Int. Cl.$^7$ .............................................. G02F 1/335
(52) U.S. Cl. ............................. 385/7; 385/39; 372/20; 372/13; 372/64; 359/326
(58) Field of Search ......................... 385/1, 4, 7, 16, 385/27, 30, 39–42, 50; 372/6, 13, 20, 64; 359/326–332

(56) References Cited

U.S. PATENT DOCUMENTS

| | | | |
|---|---|---|---|
| 3,850,503 A | 11/1974 | Riseberg et al. | 350/96 |
| 4,433,895 A | * 2/1984 | Puech et al. | 385/41 |
| 4,751,710 A | 6/1988 | Yamaguchi et al. | 372/50 |
| 5,164,954 A | 11/1992 | Su | 372/94 |
| 5,301,201 A | 4/1994 | Dutta et al. | 372/43 |
| 5,473,722 A | 12/1995 | Sohler et al. | 385/132 |
| 5,541,945 A | 7/1996 | Yamaguchi et al. | 372/20 |
| 5,542,009 A | 7/1996 | Kuehnle | 385/7 |
| 5,594,744 A | 1/1997 | Lefevre et al. | 372/20 |
| 5,610,760 A | * 3/1997 | Drenten et al. | 359/332 |
| 5,789,274 A | 8/1998 | Yamaguchi et al. | 438/32 |
| 6,025,939 A | 2/2000 | Lowenhar et al. | 359/34 |
| 6,108,355 A | 8/2000 | Zorabedian | 372/20 |
| 6,282,332 B1 | 8/2001 | Bosso et al. | 385/7 |
| 6,333,941 B1 | 12/2001 | Hung | 372/20 |
| 6,370,308 B1 | 4/2002 | Nakazawa et al. | 385/132 |

FOREIGN PATENT DOCUMENTS

| | | | | |
|---|---|---|---|---|
| EP | 63175 A | * | 10/1982 | G02F/1/33 |
| JP | 02160221 A | * | 6/1990 | G02F/2/02 |
| JP | 04134431 A | * | 5/1992 | G02F/1/335 |
| JP | 09258285 A | * | 10/1997 | G02F/2/02 |

* cited by examiner

Primary Examiner—John D. Lee
Assistant Examiner—Scott A Knauss
(74) Attorney, Agent, or Firm—Paul Davis; Heller Ehrman White & McAuliffe

(57) ABSTRACT

The present invention relates to an integrated light source having first and second optical waveguides defining a first optical coupling region for coupling light therebetween. At least one of the optical waveguides includes a gain medium configured to emit light upon irradiation. The light source also includes a first acoustic wave source to subject the first optical coupling region to acoustic waves having a longitudinal frequency $\omega_{AC1}$, whereby a frequency of light propagating along one of the first and second waveguides differs from a frequency of light propagating along the other waveguide by an amount by an amount $\omega_{AC1}$.

42 Claims, 11 Drawing Sheets

METHOD AND SYSTEM FOR ACOUSTICALLY TUNING A LIGHT SOURCE

RELATED APPLICATIONS

This application is related to U.S. application Ser. No.10/173,579, titled Light Source For Generating Output Signal Having Evenly Spaced Apart Frequencies and filed on even date herewith, invented by Israel Smilanski, Isaac Shpantzer, Jacob B. Khurgin, Nadejda Reingand, Pak Shing Cho, and Yaakov Achiam, which application is incorporated herein.

FIELD OF THE INVENTION

The present invention relates to an acoustically tuneable light source and method for acoustically tuning a light source.

BACKGROUND OF THE INVENTION

Tuneable light sources output light comprising at least one of a plurality of frequencies. One type of tuneable light source, the tuneable distributed feedback (DFB) laser, has found applications in optical communications. The tuning time for DFB lasers, however, is on the order of milliseconds, which is slower than the microsecond tuning times required for modern optical communication systems.

Another example of a tuneable light source is a diode-pumped, packaged acousto-optically tunable Ti:Er:LiNbO3 waveguide laser described by K. Schafer et al., IEEE J. Quant. Electr., v.33, , #10, pp.1636–1641. This laser provides sub-millisecond tuning capability through TE-TM mode conversion within birefringent material. It would be desirable, however, to form a tuneable laser from non-birefringent materials, such as non-crystalline materials, because birefringent materials are more complex in manufacturing and operation.

SUMMARY OF THE INVENTION

A first embodiment of the invention relates to a light source. The light source comprises first and second optical waveguides, at least one of which waveguides comprises a gain medium. Upon excitation, such as by irradiation with light from a light source, the gain medium generates, such as by emitting, light having a plurality of frequencies, at least some of which may be output by the light source. The particular frequencies of light output by the light source may be acoustically switched at more than about 100 kHz.

The first and second waveguide define a first optical coupling region, wherein light, such as the generated light, propagating along one of the waveguides may couple to the other waveguide. Preferably, only light that couples between waveguides may be output by the tuneable light source. The optical frequency that couples between waveguides may be acoustically switched by subjecting the first optical coupling region to acoustic waves having a longitudinal frequency $\omega_{AC1}$. Essentially the only light that may couple is light that satisfies a matching condition of the first coupling region whereby, upon coupling, a frequency of the light is shifted by about $\pm\omega_{AC1}$.

A second embodiment of the present invention is related to an integrated laser cavity that may be used to generate laser light. The laser cavity comprises first and second optical waveguides, which define an offset coupling region therebetween. By offset it is meant that longitudinal axes of the first and second optical waveguides are spaced apart from one another. At least one of the optical waveguides comprises a gain medium configured to, upon excitation, generate light.

Light propagating along one of the first and second waveguides may couple to the other waveguide at the coupling region. The frequency of light that may couple is acoustically tuneable by varying a first longitudinal acoustic wave vector $K_{AC}$ of acoustic waves impinging upon the first coupling region. Upon coupling from one waveguide to the other, a wave vector of the coupled light is shifted by an amount $K_{AC}$. Preferably, only light that couples may be output by the integrated laser cavity.

Another embodiment of the invention relates to an integrated interferometer having at least first and second different optical paths. The interferometer includes first and second coupling regions, whereby light propagating along the first and second optical paths couples interferingly to a first waveguide and propagates therealong. A first acoustic wave source subjects the first and second coupling regions to acoustic waves having a first longitudinal acoustic wave vector $K_{AC1}$, whereby a wave vector of light propagating along one of the first and second optical paths differs from a wave vector of light propagating along the first waveguide by an amount $K_{AC1}$.

Another aspect of the invention relates to a method for producing light. In one embodiment, a gain medium within a first waveguide is irradiated with pump light to obtain generated light having an generated light frequency. The generated light is coupled to a second waveguide by subjecting at least some of the generated light to acoustic waves having a first frequency $\omega_{ACi}$ to thereby provide second light having a second light frequency, wherein the second light frequency differs from the emitted light frequency by an amount $\omega_{ACi}$. At least some of the second light is output.

Another aspect of the invention relates to an optical transmitter that includes an optical cavity comprising an optical coupling region between first and second waveguides. An acoustic wave source is disposed to subject the optical coupling region to acoustic waves having an acoustic frequency $\omega_i$, whereby, upon coupling from one waveguide to the other, a frequency of light oscillating within the optical cavity is shifted by an amount of about $\pm\omega_i$. The optical cavity is configured to output at least some of the oscillating light. The transmitter also includes an acoustic wave source driver for changing the acoustic frequency $\omega_i$, wherein a frequency of light output by the optical cavity changes upon changing the acoustic frequency $\omega_i$.

Light transmitted by the optical transmitter may be received by a receiver that simultaneously detects the transmitted light with light output by an acousto-optically tuneable optical cavity local to the receiver.

BRIEF DESCRIPTION OF THE DRAWINGS

The present invention is discussed below in reference to the drawings in which.

DETAILED DESCRIPTION OF THE INVENTION

Figure 1:
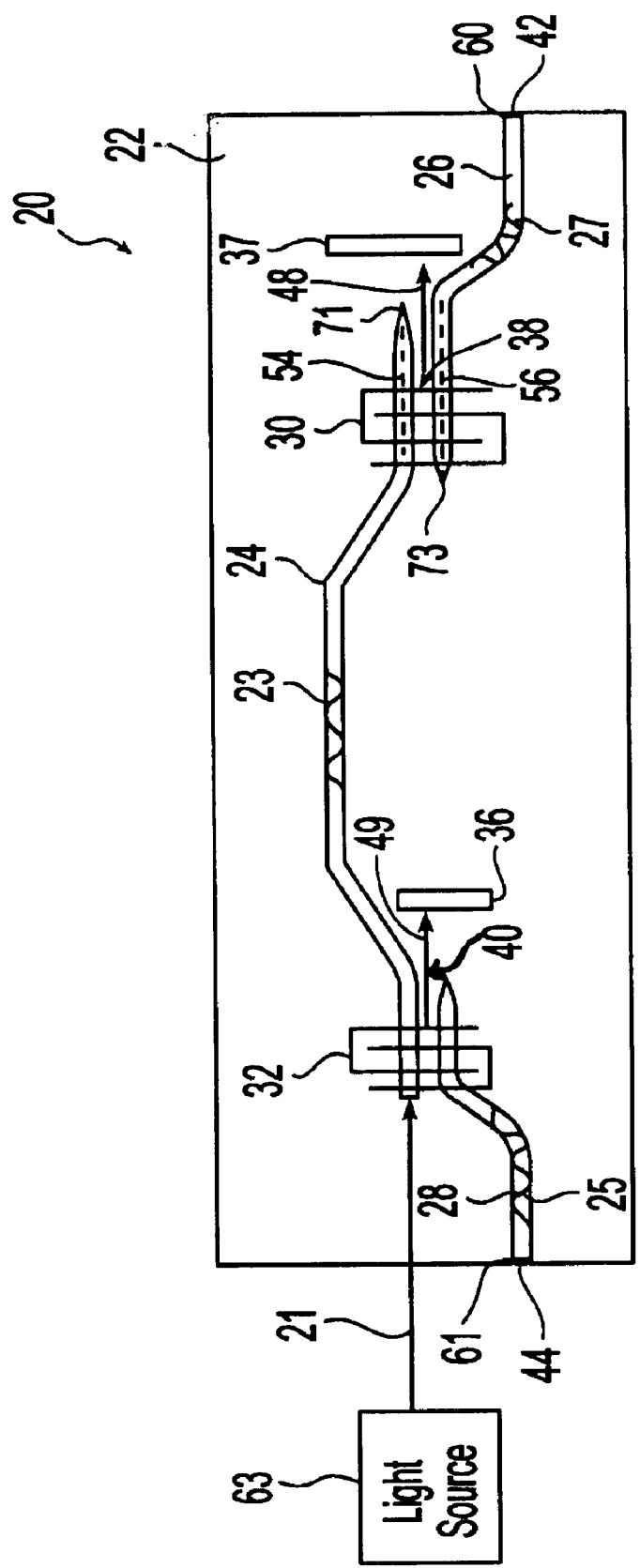
FIG. 1 shows a tuneable light source according to the invention.
Figure 2:
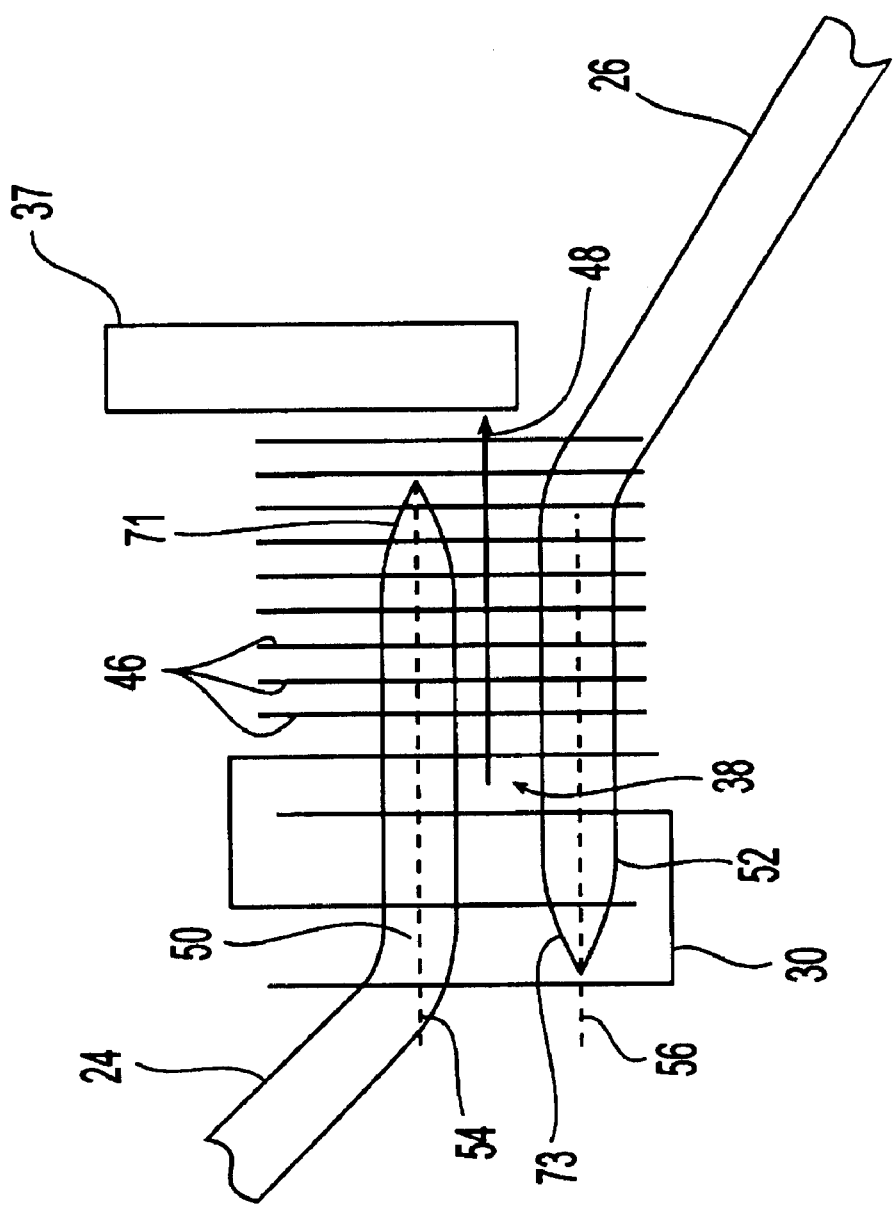
FIG. 2 shows a partial view of a coupling region of the light source of FIG. 1.

Referring to FIGS. 1 and 2, a light source, which in this embodiment is a laser 20, which preferably includes first, second, and third waveguides 24, 26, and 28. Laser 20 is preferably tuneable, by which it is meant that a frequency of light output by laser 20 may be varied. The laser 20 may be integral with a substrate 22, such as by having the waveguides formed therein by, for example, diffusive doping. In general, preferred substrate materials are noncrystalline. Silica, such as amorphous silica, is an example of a suitable substrate material.

First and second waveguides 24, 26 define a first coupling region 38, wherein light propagating along one of the first and second waveguides may couple to the other waveguide to provide coupled light, which propagates therealong. First and third waveguides 24, 28 define a second coupling region 40, wherein light propagating along one of the first and third waveguides may couple to the other waveguide to provide coupled light, which propagates therealong. Preferred coupling regions of devices in accordance with the invention are essentially free of crystalline material. First and second coupling regions 38, 40 are preferably spaced apart from one another along a general propagation dimension of the first waveguide 24.

Tuneable laser 20 includes an optical cavity preferably having at least two reflective elements and including the first, second, and third waveguides. By "including the first, second, and third waveguides" it is meant that light oscillating within the optical cavity propagates along at least portions of each of the first, second, and third waveguides. Preferably, only light satisfying a matching condition may oscillate within the cavity. Oscillation within the optical cavity preferably comprises propagation of the light between respective ends 60, 61 of second and third waveguides 26, 28. A first reflective element 42 may be optically associated with end 60 and preferably operates as an output coupler that is only partially reflective at output wavelengths of tuneable laser 20. A second reflective element 44 may be associated with end 61 and preferably reflects substantially all light at output wavelengths of tuneable laser 20.

First waveguide 24 has a propagation constant different from a propagation constant of second and third waveguides 26, 28, which may have the same propagation constant. As understood in the art, a propagation constant of a waveguide depends upon the dimensions, such as the height and width of the waveguide. Dimensions of first waveguide 24 may be different from dimensions of second and third waveguides 26, 28. The propagation constant also depends upon the refractive index of the material forming the waveguide. First waveguide 24 may have a refractive index that is different from respective refractive indexes of second and third waveguides 26, 28.

The polarization of light is preferably substantially maintained upon coupling at coupling regions of devices in accordance with light sources of the invention. For example, an angular difference between (1) coupled light that has coupled from one of the waveguides (here termed the origin waveguide) to another waveguide and (2) the light propagating along the origin waveguide is less than about $\pi/2$, such as less than about $\pi/8$.

Portions of at least one and preferably all of the first, second, and third waveguides 24, 26, and 28 are doped with a gain medium. The gain medium preferably generates light, such as fluorescence with a plurality of wavelengths in at least the C-band, when irradiated with pump light. Of course, the tuneable laser 20 is not limited to gain media generating light in the infrared. For example, gain media generating light in the visible may also be used. A preferred gain medium, such as a gain medium comprising Er(Yb, Nd), exhibits population inversion and lasing under suitable pumping conditions.

At least one of the waveguides is preferably configured to receive pump light from a pump source 63. For example, first waveguide 24 receives pump light 21 from a light source 63, which generates light that has a wavelength suitable to generate light from the gain medium. Preferably, each waveguide comprising gain medium receives pump light from a pump source. Of course, all of the waveguides receiving pump light may receive the pump light from a single pump source. An example of a pump source suitable for irradiating Er(Yb, Nd) is a diode laser emitting light in the infrared, such as at about 1480 nm. A waveguide may receive pump light via, for example, a facet at an end of the waveguide, side coupling, or grating coupling. Pump light received by a waveguide propagates therealong to thereby irradiate gain medium associated with the waveguide. Light sources in accordance with the present invention are not limited to optical pumping so that, for example, electrically pumped gain media may also be used.

As best seen in FIG. 2, waveguide portions 50, 52 of respective first and second waveguides 24, 26 that are adjacent to first coupling region 38 define respective longitudinal axes 54, 56, which are preferably essentially parallel. Light propagating along one of waveguide portions 50, 52 propagates generally along its respective longitudinal axis 54, 56, which axes are preferably offset from one another. A coupling region in accordance with the invention may be described as an "offset" coupling region where light that is propagating along one waveguide of the coupling region translates laterally upon coupling to the other waveguide of the coupling region.

Coupling regions of the invention are preferably configured to substantially prevent light that does not couple from one waveguide to another from continuing to propagate along the waveguide. First and second waveguide portions 50, 52 preferably include attenuation regions 71, 73 to attenuate light that has not coupled from one of the waveguides 24, 26 to the other. Attenuation regions 71, 73 may be shaped, such as by tapering, to attenuate light. Thus, for example, light satisfying a matching condition discussed below and propagating along first waveguide portion 50 toward attenuation region 71 couples to second waveguide portion 52 of second waveguide 26. Preferably, however, propagating light that fails to satisfy the matching condition is substantially prevented from continued propagation by attenuation region 71.

Tuneable laser 20 includes a first acoustic wave source 30 to facilitate variable wavelength coupling between first and second waveguides 24, 26. First acoustic wave source subjects first coupling region 38 to acoustic waves 46 having a variable frequency $\omega_{AC1}$ and propagating generally along a propagation axis 48. A second acoustic wave source 32 subjects second coupling region 40 to acoustic waves (not shown) also having a variable frequency $\omega_{AC2}$ and propagating with a velocity $V_{AC}$ generally along a propagation axis 49 to thereby facilitate variable wavelength coupling between first and third waveguides 24, 28. First and second acoustic wave sources 30, 32 may be piezo-electric transducers. Frequencies $\omega_{AC1}$ and $\omega_{AC2}$ may be the same or different.

First and second acoustic wave sources are operably associated with at least one acoustic wave source driver, which provides an acoustic frequency signal to the acoustic wave sources to vary the respective acoustic frequency output by each source.

An acoustic absorber 37 may be disposed to absorb or otherwise prevent acoustic waves 46 that have passed through first coupling region from returning therethrough, such as by reflection. A second acoustic absorber 36 may be disposed to absorb or otherwise prevent acoustic waves emitted by second acoustic wave source 32 that have passed through second coupling region 40 from returning therethrough, such as by reflection. Additional acoustic absorbers may be positioned to substantially prevent propagation of the acoustic waves lateral to propagation axes 48, 49.

Suitable coupling conditions for the coupling of light from one waveguide to another are discussed next using light propagating along first waveguide 24 and coupling to second waveguide 26 at first coupling region 38 as an example. It should be understood, however, the following coupling conditions also pertain coupling at coupling region 40 as well as coupling region of other light sources of the invention. A suitable condition for coupling is defined herein as a matching condition.

A wave vector $K_2$ of an optical wave 23 propagating along waveguide 24 is given by:

$$K_2 = \frac{\omega_{23}}{c} n_{24} \qquad \text{Eq. 1}$$

where $\omega_{23}$ is a frequency of optical wave 23, c is the speed of light in a vacuum, and $n_{24}$ is the index of refraction of waveguide 24 for light having a frequency $\omega_{23}$. Acoustic wave source 30 subjects first coupling region 38 to acoustic waves 46 having a frequency $\omega_{AC}$, which waves travel with a longitudinal velocity $V_{AC}$ with respect to first coupling region 38. By longitudinal frequency, it is meant the component of the acoustic waves taken along a longitudinal axis 54 of first waveguide 24.

Acoustic waves 46 have an acoustic wave vector $K_{AC}$ and form an acoustic grating having a period $\Delta K$ given by:

$$K_{AC} = \Delta K = \frac{\omega_{AC}}{V_{AC}} \qquad \text{Eq. 2}$$

The acoustic grating interacts with optical wave 23, such as by scattering at least some of optical wave 23, to provide an optical wave having a wave vector $K_1 = K_2 + \Delta K$. At least some of the optical wave with wave vector $K_1$ couples into waveguide 26 and propagates therealong with wave vector $K_1$, where the wave vector $K_1$ is given by:

$$K_1 = \frac{\omega_{27}}{c} n_{26} = K_2 + \Delta K \qquad \text{Eq. 3}$$

where $\omega_{27}$ is a frequency of optical wave 27 and $n_{26}$ is a refractive index of waveguide 26 for light having a frequency $\omega_{27}$.

The matching condition, $\Delta K$, is the difference between the wave vectors of optical waves 23 and 27, is given by the period of the acoustic grating:

$$\Delta K = \frac{\omega_{AC}}{V_{AC}} = \frac{\omega_{27}}{c} n_{26} - \frac{\omega_{23}}{c} n_{24} = \frac{\omega_{27}}{c} \Delta n + \frac{\Delta\omega}{c} n_{24} \qquad \text{Eq. 4}$$

where $\Delta n$ is a refractive index difference given by $n_{26}-n_{24}$ and $\Delta\omega$ is a frequency difference given by $\omega_{27}-\omega_{23}$.

When the matching condition is satisfied, light having a wave vector $K_2$ will couple from first waveguide 24 to second waveguide 26. Likewise, light having a wave vector $K_1$ will couple from second waveguide 26 to first waveguide 24. A similar matching condition must be met before light will couple in either direction between first waveguide 24 and third waveguide 28 at second coupling region 40. Oscillation, and therefore lasing, will only occur at frequencies for which the matching condition is satisfied. Thus, acoustic sources 30, 32 determine the frequency of light that is output by tuneable laser 20 for any given acoustic wave frequency.

Assuming that $(\Delta\omega/c) n_{24}$ is negligible compared to other terms in Eq. 4, a frequency $\omega_{out}$ of light that may be output by tuneable laser 20 is given by $$\omega_{out} = \frac{c\omega_{AC}}{\Delta n V_{AC}} \qquad \text{Eq. 5}$$

During use, tuneable light source 20 may operate as follows. Gain medium within at least one of first, second, and third waveguides 24, 26, 28 is irradiated with pump light 21. Upon pumping, the gain medium generates light having a plurality of frequencies. At least one of first and second coupling regions are subjected to acoustic waves having a frequency $\omega_{AC}$ so that light that is generated and propagates along, for example, first waveguide 24 may couple to, for example, the second waveguide 26. Because only one frequency of the generated light may satisfy a given matching condition, the coupled light comprises essentially only light having the satisfying frequency. Thus, tuneable light source may be acoustically tuned by varying $\omega_{AC}$ to output light having any one of the frequencies generated by the gain medium. The acoustic frequency $\omega_{AC}$ is preferably varied using the acoustic wave source driver associated with the acoustic wave generators. The frequency of light output by tuneable laser 20, like all tuneable light sources of the invention, may be varied, by changing the frequency of acoustic waves $\omega_{AC}$, between first and second frequencies in less than about 50 $\mu$s and preferably in less than about 10 $\mu$s.

As an example of using Eq. 5 to determine $\omega_{out}$, substitute $c=3\times10^8$ m/s, $\Delta n=1\times10^{-2}$, $V_{AC}=3\times10^4$ m/s, and $\omega_{AC}=2\times10^8$ Hz to predict an output frequency of $2\times10^{14}$ Hz, which corresponds to a wavelength of about 1.5 $\mu$m. Varying the acoustic wave frequency $\omega_{AC}$ over a range of about 191 to 196 MHz allows the output wavelength to be tuned over the range of about 1.53 to 1.57 $\mu$m. Of course, the acoustic wave frequency may be varied over wider ranges, such as about 170 to about 220 MHz or even wider ranges, to provide output wavelengths of less than 1.53 $\mu$m or greater than 1.57 $\mu$m.

Figure 3:
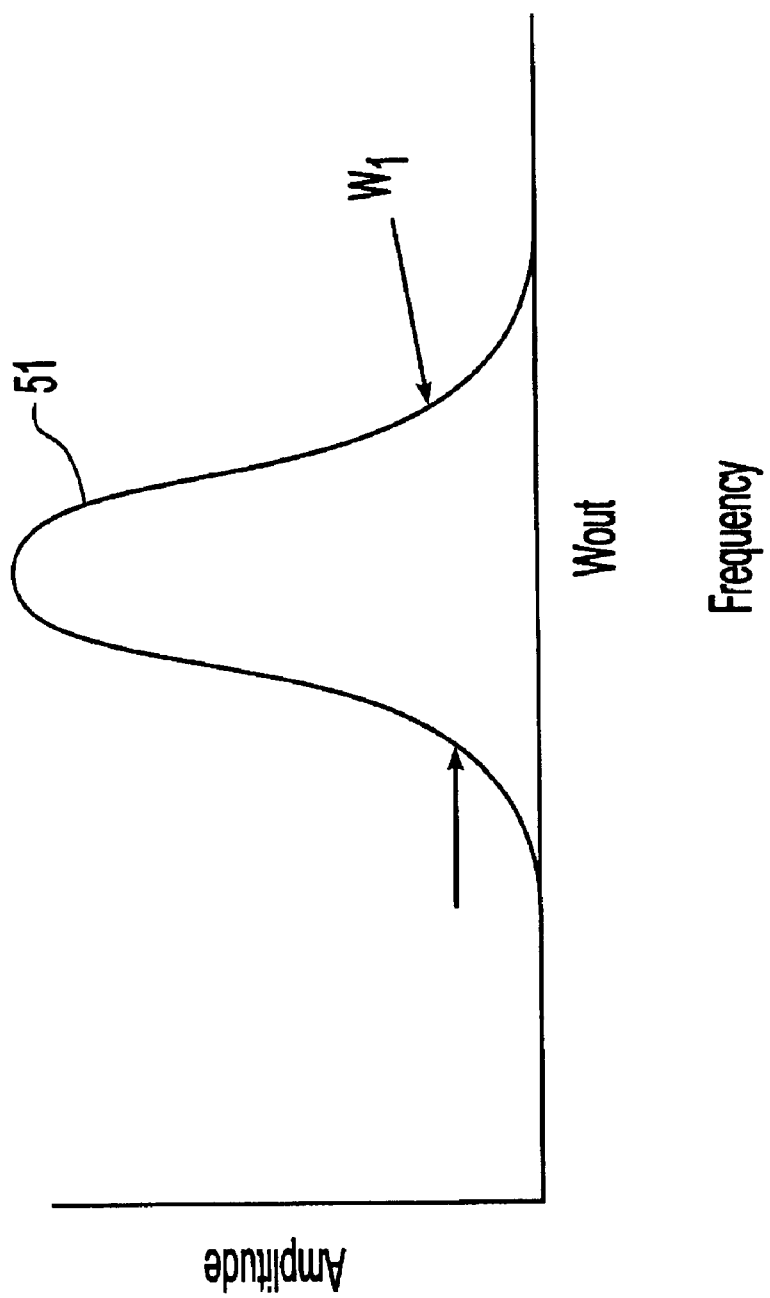
FIG. 3 shows an example of an output spectrum of the light source of FIG. 1.

Referring to FIG. 3, the spectrum of light output by tuneable laser 20 includes a output spectrum 51 light having a range of frequencies centered at $\omega_{out}$. Preferably, however, the output spectrum 51 includes substantially fewer frequencies than light emitted by the gain medium of the waveguides. A width $w_1$ of output spectrum is preferably sufficiently narrow that the output spectrum 51 can be considered, as referred to above, to consist essentially of a single frequency of light. In terms of wavelength, for example, a line width of single frequency light output by tuneable light sources of the invention is less than about 0.5 nanometers, such as less than about 0.1 nanometers.

Figure 4:
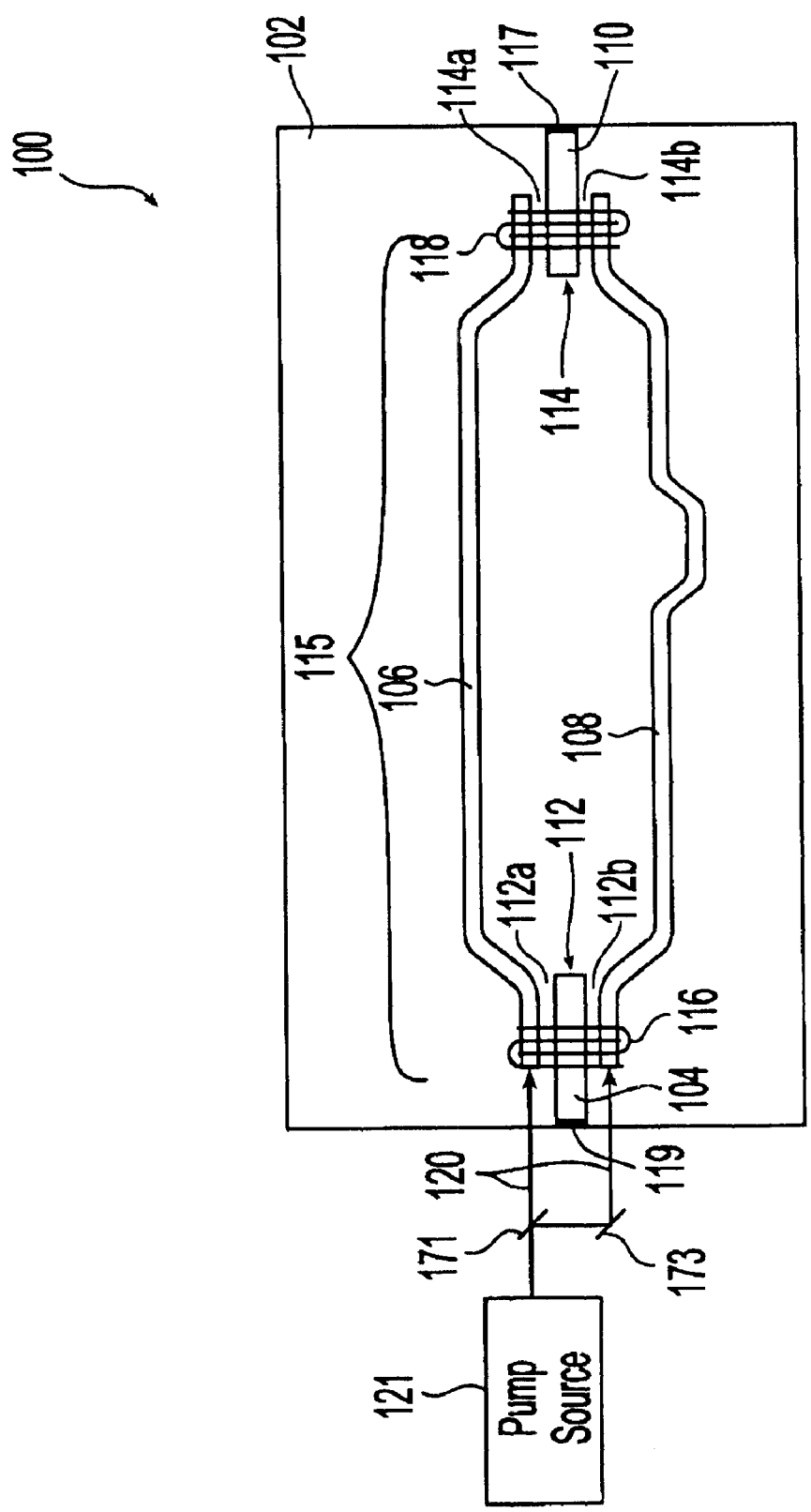
FIG. 4 shows an example of a second embodiment of a tuneable light source according to the invention.

Referring to FIG. 4, a discretely tuneable light source, which in this embodiment is a tuneable laser 100, is configured to output light having one of a set of discrete frequencies. Tuneable laser 100 includes a substrate 102, which preferably includes first, second, third, and fourth wave guides 104, 106, 108, and 110. An interferometer 115 defines, at least in part, the set of discrete frequencies available to be output by tuneable laser 100. Substrate 102 may be formed of material identical to that of substrate 22.

At least one and preferably both of second and third waveguides 106, 108 include a gain medium, which can be identical to the gain medium discussed above for tuneable laser 20. At least one of the waveguides 104, 106, 108, 110 is configured to receive light from a pump source 121 to irradiate gain medium of the first and second waveguides. For example, second and third waveguides 106, 108 of tuneable laser 106 are configured to receive pump light 120, which propagates along waveguides 106, 108 irradiating gain medium therein. The pump source 121 may be identical to the pump source described above for tuneable laser 20. The output from a single pump source may be split, such as by a beam splitter 171 and steered, such as by a mirror 173 to respective waveguides.

Tuneable laser 100 includes a first coupling region pair 112. A coupling region pair preferably comprises a pair of coupling regions where light may couple between each of two waveguides and a third waveguide. For example, coupling region pair 112 includes first and second coupling regions 112a, 112b. A first acoustic wave source 116 subjects the first coupling region pair 112 to acoustic waves. Upon activation of acoustic wave source 116, light satisfying a matching condition will couple between first waveguide 104 and second and third waveguides 106, 108.

Tuneable laser 100 includes a second coupling region pair 114 comprising third and fourth coupling regions 114a, 114b. A second acoustic wave source 118 subjects the second coupling region pair 114 to acoustic waves. Upon activation of the acoustic wave source 118, light satisfying a matching condition will couple between fourth waveguide 110 and second and third waveguides 106, 108.

At least one of the waveguides of tuneable laser 100 is configured to output light that has propagated along the waveguide. For example, fourth waveguide 110 includes an output coupler 117, which allows a first portion of light propagating along fourth waveguide 110 to be emitted as output light 122. A second portion of light propagating along fourth waveguide 110 is reflected by output coupler 117 to thereby return along fourth waveguide 110. The returning light may couple into second and third wave guides 106, 108, where the light propagates along until coupling into first waveguide 104, where the light propagates therealong until reaching a reflector 119, which preferably reflects substantially all light incident upon it. Thus, output coupler 117, reflector 119 and the waveguides define an optical cavity, which may be a laser cavity supporting oscillation within a gain medium therein. As discussed below, oscillation only occurs when the light propagating within laser 100 satisfies both a matching condition for coupling and experiences constructive interference upon coupling.

Figure 5:
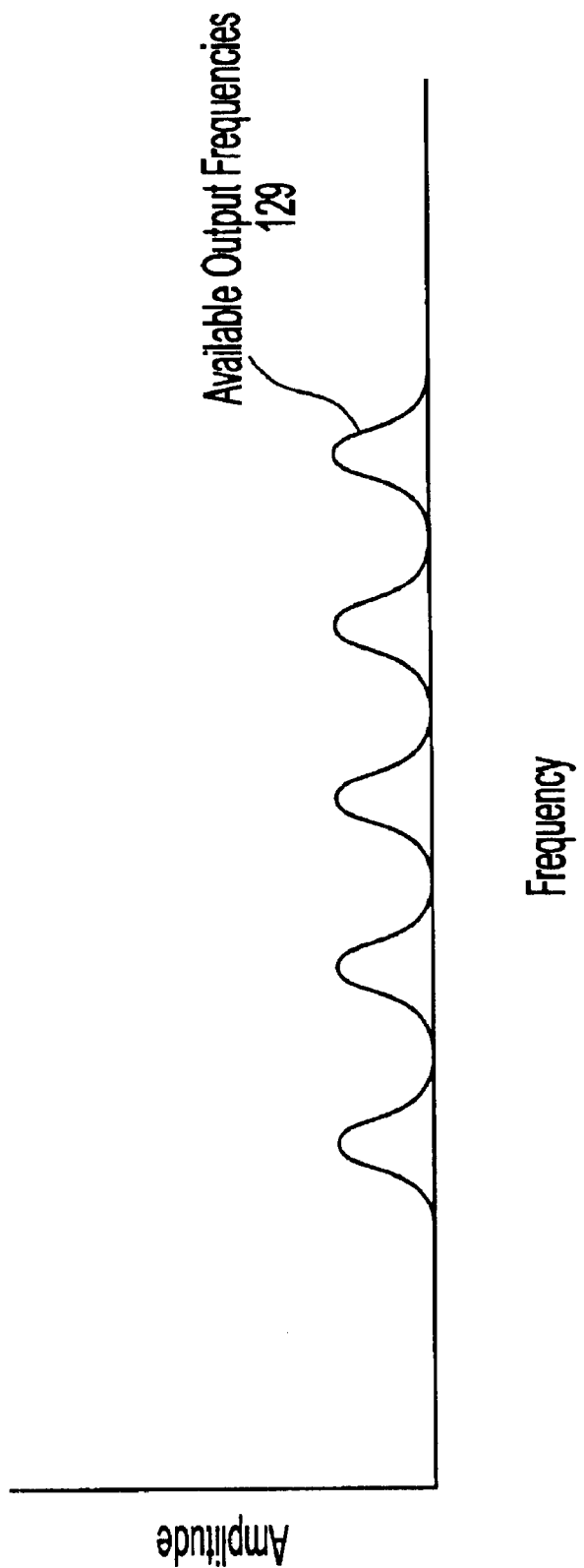
FIG. 5 shows a plot of available output frequencies for the tuneable light source of FIG. 4.
Figure 6:
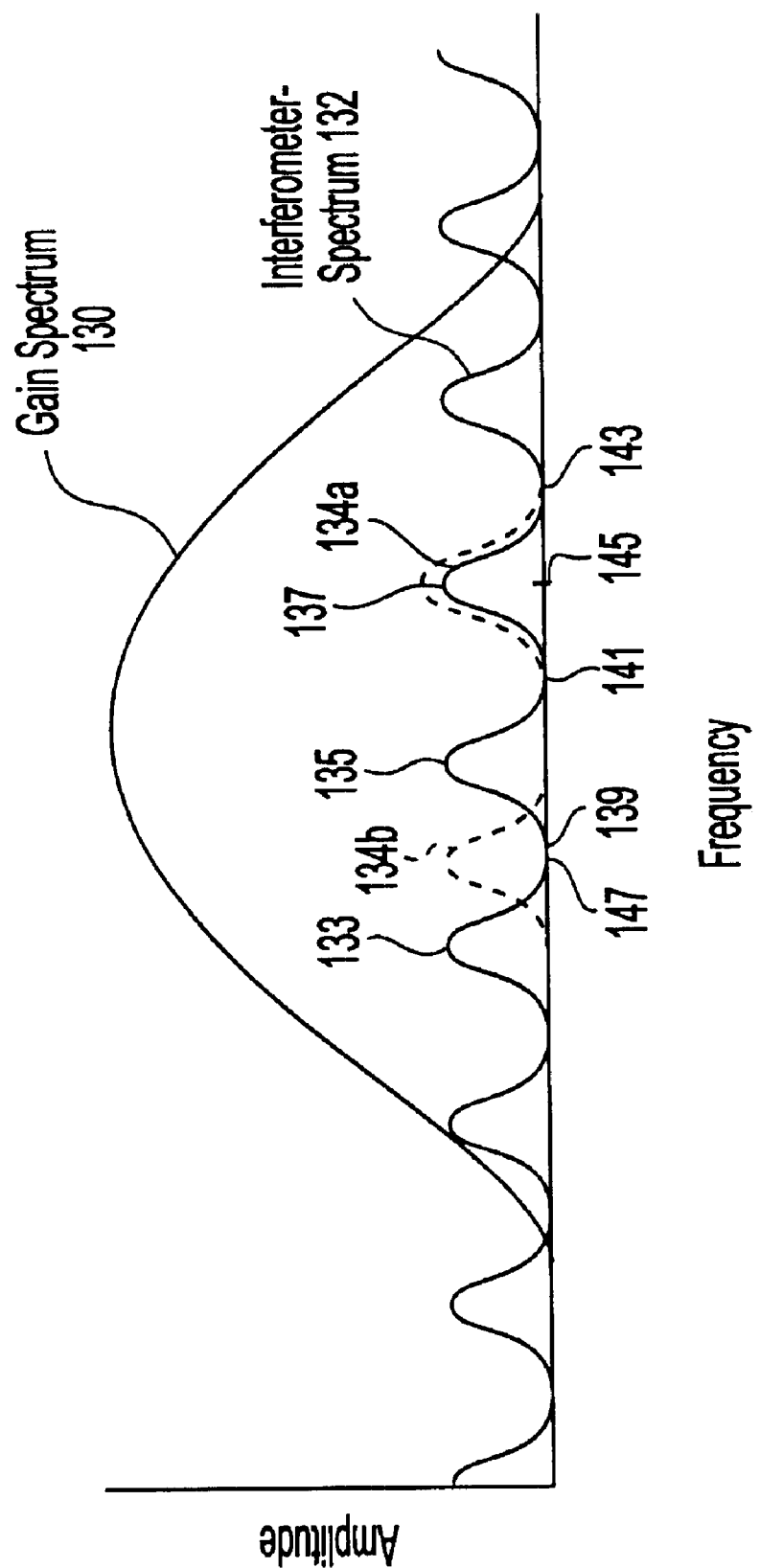
FIG. 6 shows spectra that contribute to the output frequencies of FIG. 5.

Referring to FIGS. 5 and 6, the available output frequencies 129 of laser 100 define a "comb" of essentially equally spaced frequencies. The particular frequency that is output by tuneable laser 100 is determined by a gain spectrum 130 of the gain medium, an interferometer spectrum 132 of interferometer 115, and an acoustic grating spectrum. For convenience of the following discussion, FIG. 6 shows two acoustic grating spectra 134a and 134b.

It should be understood that the optical cavity defined by just the output coupler 117 and the reflector 119 (without the waveguides) creates a comb of frequencies, which are narrowly spaced compared to the available output frequencies 129 of laser 100. Therefore, the frequency comb defined by the optical cavity does not substantially affect the output frequencies available from laser 100.

The gain spectrum 130 is determined by frequencies at which the gain medium of tuneable laser 100 generates light upon pumping, such as by irradiation with pump light. For a laser, such as tuneable laser 100, a gain spectrum represents a broad envelope of frequencies at which lasing may occur, as understood in the art. A preferred gain spectrum covers at least a portion, and preferably all, of the C-band of frequencies. Interferometer 115 determines which frequencies of gain spectrum 130 are available for output by tuneable laser 100.

Interferometer spectrum 132 is defined by interferometer 115. Tuneable laser 100 may output light at frequencies corresponding to each maximum of interferometer spectrum 132. Essentially no light may be output at frequencies corresponding to minima of interferometer spectrum 132. The maxima and minima are determined by frequencies for which interferometer 115 causes constructive or destructive interference of light propagating therein.

Interference occurs because interferometer 115 includes at least two optical paths, each having a respective different length. Preferably, interferometer 115 is a Mach Zehnder interferometer having respective optical paths along second and third waveguides 106, 108. An optical path length along third waveguide 108 is greater than an optical path length along second waveguide 106. As defined herein, the optical path lengths of each of the second and third waveguides 106, 108 is the length of the respective waveguide between first and second coupling region pairs 112, 114. The frequency spacing, $\Delta F$, between adjacent maxima of interferometer spectrum 132 is given by $\Delta F=c/(n \times \Delta p)$, where n is the refractive index of the longer waveguide and $\Delta p$ is the absolute path length difference. For $LiNbO_3$, a 25 GHz spacing $\Delta F$ corresponds to about 5.4 mm path length distance difference. A 12.5 GHz spacing corresponds to a 10.8 mm path length difference. A 200 GHz spacing corresponds to a 1.35 mm path length difference.

As an example of interference caused by interferometer 115, consider light, propagating along first waveguide 104, which light couples, at first coupling region pair 112, into both second and third waveguides 106, 108 to propagate therealong. The light then propagating along each of the second and third waveguides 106, 108 couples, at second coupling region pair 114, into fourth waveguide 110, whereupon interference occurs. The light may be said to have interferingly coupled by way of the coupling region pair. The interference is selective, either constructive or destructive, because of the path length difference along second and third waveguides 106, 108. Of course, interference also occurs at first coupling region pair 114 for light propagating in the opposite direction.

Maxima, such as maxima 133, 135, and 137, of interferometer spectrum 132 are centered at frequencies for which constructive interference occurs. Thus, the maxima correspond to light for which the optical path length difference along second and third waveguides 106, 108 is an integral multiple of the wavelength of the light propagating therealong. Minima, such as minima 139, 141, and 143, of interferometer spectrum 132 are centered at frequencies for which destructive interference occurs. The frequency minima correspond to light for which the optical path length difference along second and third waveguides 106, 108 is a integral multiple of ½ of the wavelength of the light propagating therealong.

The acoustic grating spectrum of tuneable laser 100, is defined by the narrowest range of frequencies that will couple efficiently between (1) first waveguide 104 and second, third waveguides 106, 108, or (2) fourth waveguide 110 and second, third waveguides 106, 108. Light exactly satisfying a matching condition will couple efficiently from one waveguide to another. However, light that has a frequency only slightly different will also couple at least in part because of the finite size of the acoustic grating and coupling region. In practical terms, therefore, a distribution of frequencies will couple from one waveguide to the other. Of course, only a small range of frequencies (the acoustic grating spectrum) will couple efficiently enough to lase. A central frequency of the acoustic grating spectrum may be varied by varying the frequencies of acoustic waves impinging upon the first and second coupling regions.

During operation, gain medium within tuneable laser 100 may be irradiated with pump light from a pump source to thereby obtain emitted light that propagates along waveguides of tuneable laser 100. First and second coupling region pairs are subjected to acoustic waves from first and second acoustic wave sources, respectively. The acoustic waves from the first and second acoustic wave sources may have the same frequency. Preferably, substantially all light coupling between the waveguides has a frequency corresponding to a matching condition of a respective coupling region.

To select an output frequency corresponding to a particular one of the maxima of interferometer spectrum 115, the frequency of acoustic waves impinging upon the coupling pairs are varied so that the acoustic grating spectrum overlaps the particular maximum. For example, first acoustic grating spectrum 134a has a central frequency 145 that coincides with a maximum 137 of interferometer spectrum 132. Tuneable laser 100 would output light corresponding to central frequency 145. On the other hand, second grating spectrum 134b has a central frequency 147 that coincides with a minimum 139 of interferometer spectrum 132. Essentially no light would be output for this condition.

Upon coupling, light having a wavelength that provides destructive interference is attenuated compared to light having a wavelength that provides constructive interference. Thus, even if the acoustic wave frequency is tuned so that light propagating within the waveguides of tuneable laser 100 satisfies a matching condition allowing the light to couple, oscillation will not occur unless the frequency of the light experiences constructive interference at first and second coupling pairs 112, 114.

Light is output from at least one of the waveguides, such as through output coupler 117 of fourth waveguide 110. Preferably, substantially all of the light output from tuneable laser 100 satisfies both a matching condition of the first and second coupling regions and has a wavelength corresponding to constructive interference. Tuning the wave vector $K_{AC}$ of acoustic waves output by first and second acoustic wave sources allows light corresponding to a particular one of the discrete set of frequencies to be obtained. Thus, tuneable laser 100 outputs light having one of a discrete set of frequencies corresponding to maxima of interferometer spectrum 132.

Figure 7:
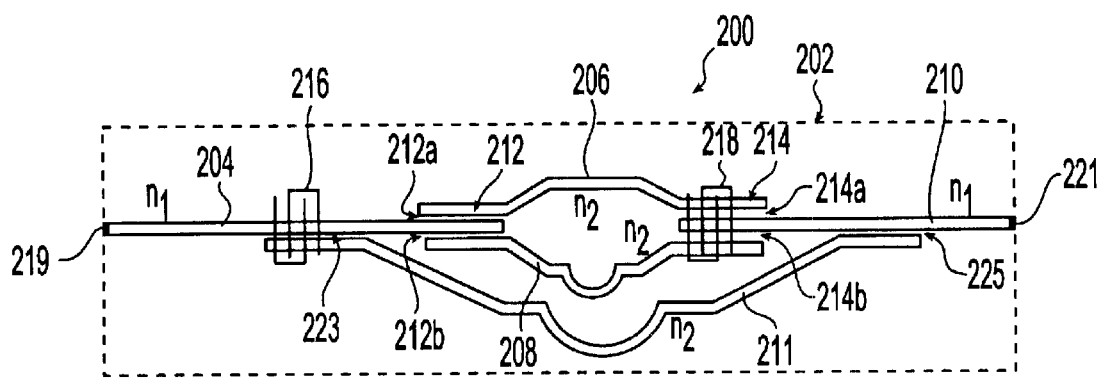
FIG. 7 shows a third embodiment of a light source according to the invention.

Referring to FIG. 7, a tuneable laser 200 includes first and second interferometers to thereby provide a comb of output frequencies having teeth with a narrower width than teeth of a comb of a laser having only a single interferometer. Tuneable laser 200, which is preferably integral with a substrate 202, includes first, second, third, and fourth, waveguides 204, 206, 208, and 210 having a configuration similar to waveguides 104, 106, 108, and 110 of tuneable laser 100. Tuneable laser 200 defines an optical cavity between a first reflector 219 and a second reflector 221.

A first interferometer of tuneable laser 200 includes a first coupling region pair 212, including first and second coupling regions 212a, 212b and a second coupling region pair 214, including third and fourth coupling regions 214a, 214b. An optical path along third waveguide 208 is greater than an optical path along second waveguide 206. Thus, light propagating along second and third waveguides 206, 208 and coupling at first or second coupling region pair 212, 214 will experience interference, as discussed above for interferometer 115.

A second interferometer of tuneable laser 200 includes third and fourth coupling regions 223, 225. Third coupling region 223 couples light between first waveguide 204 and a fifth waveguide 211. Fourth coupling region 225 couples light between fifth waveguide 211 and fourth waveguide 210. At each of coupling regions 223, 225, coupling may occur in either direction. A first optical path, between third and fourth coupling regions 223, 225, along fifth waveguide 211 is different than a second optical path, between third and fourth coupling regions 223, 225. Thus, upon coupling at either of third and fourth coupling regions 223, 225, interference occurs between light having traveled along the first and second optical paths. The second optical path includes first interferometer 215.

A first acoustic wave source 216 subjects third coupling region 223 and first coupling region pair 212 to acoustic waves. A second acoustic wave source 218 subjects second coupling region pair 214 and fourth coupling region 225 to acoustic waves. The frequencies of acoustic waves impinging upon third coupling region 223 and second coupling region pair 214 can be varied to select the output frequency of tuneable laser 200. Although FIG. 7 shows that acoustic wave sources 216 and 218 each subject more than 1 coupling region to acoustic waves, it should be understood that each coupling region may be provided with a dedicated acoustic wave source. Also, devices in accordance with the present invention may be configured with an acoustic wave source that subjects more than 2 coupling regions to acoustic waves. Light source 200 may also include acoustic wave absorbers, which may be similar to acoustic wave absorbers 36 and 37 of light source 20.

Figure 8:
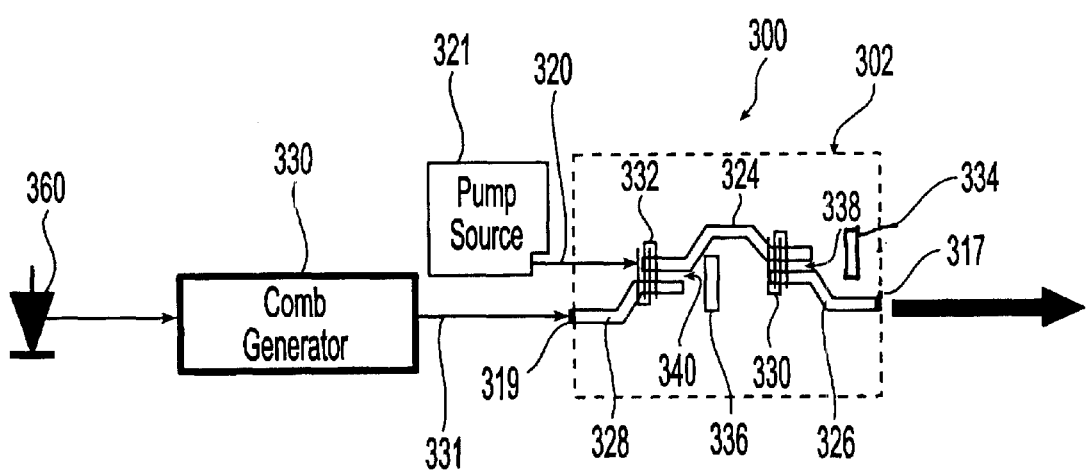
FIG. 8 shows a fourth embodiment of a light source according to the invention.

Referring to FIG. 8, a tuneable light source, which in this embodiment is a tuneable laser 300, outputs light having one of a set of discrete optical frequencies. The available output frequencies of tuneable laser 300 are determined by the output frequencies of a secondary light source, such as a comb generator 330, which preferably emits light 331 having a plurality of equally spaced frequencies. The output of tuneable laser 300 can be acoustically tuned to output light at any one of the frequencies received from the external source. A comb generator suitable for use as a secondary light source is described in U.S. application Ser. No. 10/173,579, titled Light Source For Generating Output Signal Having Evenly Spaced Apart Frequencies, filed on even date herewith, invented by Israel Smilanski, Isaac Shpantzer, Jacob B. Khurgin, Nadejda Reingand, Pak Shing Cho, and Yaakov Achiam, which application is incorporated herein.

Tuneable laser 300, includes a substrate 302, which preferably includes first, second, and third waveguides 324, 326, and 328. First and second waveguides 324, 326 define a first coupling region 338, wherein light propagating along one of the first and second waveguides may couple to the other waveguide to propagate therealong. First and third waveguides define a second coupling region 340, wherein light propagating along one of the first and third waveguides may couple to the other waveguide to propagate therealong. The coupling regions 338, 340 are identical to coupling regions 38, 40.

Tuneable laser 300 includes a first and second acoustic wave sources 330, 332, which operate identically to acoustic wave sources 30, 32 to thereby facilitate variable wavelength coupling of light at first and second coupling regions 338, 340. Acoustic absorbers 334, 336 operate identically to acoustic absorbers 36, 37 of tuneable laser 20.

First and second reflective elements 317, 319 define an optical cavity including first, second, and third waveguides 324, 326, and 328. First element 317 is preferably an output coupler. Second reflective element 319 is preferably sufficiently transmissive to allow at least some of the light 331 output by comb generator 330 to be received by waveguide 328. Light having a frequency that satisfies a matching condition determined by a frequency of acoustic waves output by acoustic wave sources 330, 332, may couple between waveguides at first and second coupling regions 338, 340 and, therefore, oscillate within the optical cavity.

Portions of at least one and preferably all of the first, second, and third waveguides 324, 326, and 328 are doped with a gain medium. At least one of the waveguides is configured to receive pump light 320 from a pump source 321. The gain medium and pump source may be identical to those described for tuneable laser 20.

At least one of the waveguides 324, 326, 328 is configured to receive light 331 from the comb generator 330. Light 331 from comb generator 330 seeds the gain medium of tuneable laser 300 such that lasing occurs preferentially at frequencies of light 331. Oscillation and, therefore, lasing, will only occur, however, at frequencies which also satisfy the matching condition as discussed above. Thus, by varying the frequency of acoustic waves impinging upon first and second coupling regions 338, 340, the output frequency of tuneable laser 300 can be varied between discrete frequencies corresponding to frequencies of light 331.

In order to prevent the frequencies of light 331, and, therefore the frequency of light output by tuneable laser 300, from varying, the comb generator 330 may be locked, such as to a frequency stabilized reference laser 360. Locking comb generator 330 substantially prevents the frequencies of light 331 from shifting from one optical frequency to another. Locking may be performed by, for example, either injection-locking or phase-locking. An example of a comb generator and method for locking a laser to a comb generator is discussed by C. F. Silva et al. in "Exact Optical Frequency Synthesis Over 1 THz Using SG-DBR Lasers," Proceedings CLEO-Europe-IQEC 2000 conference, Nice, France, September, 2000, which proceeding is incorporated by reference herein to the extent necessary to understand the present invention.

Figure 9:
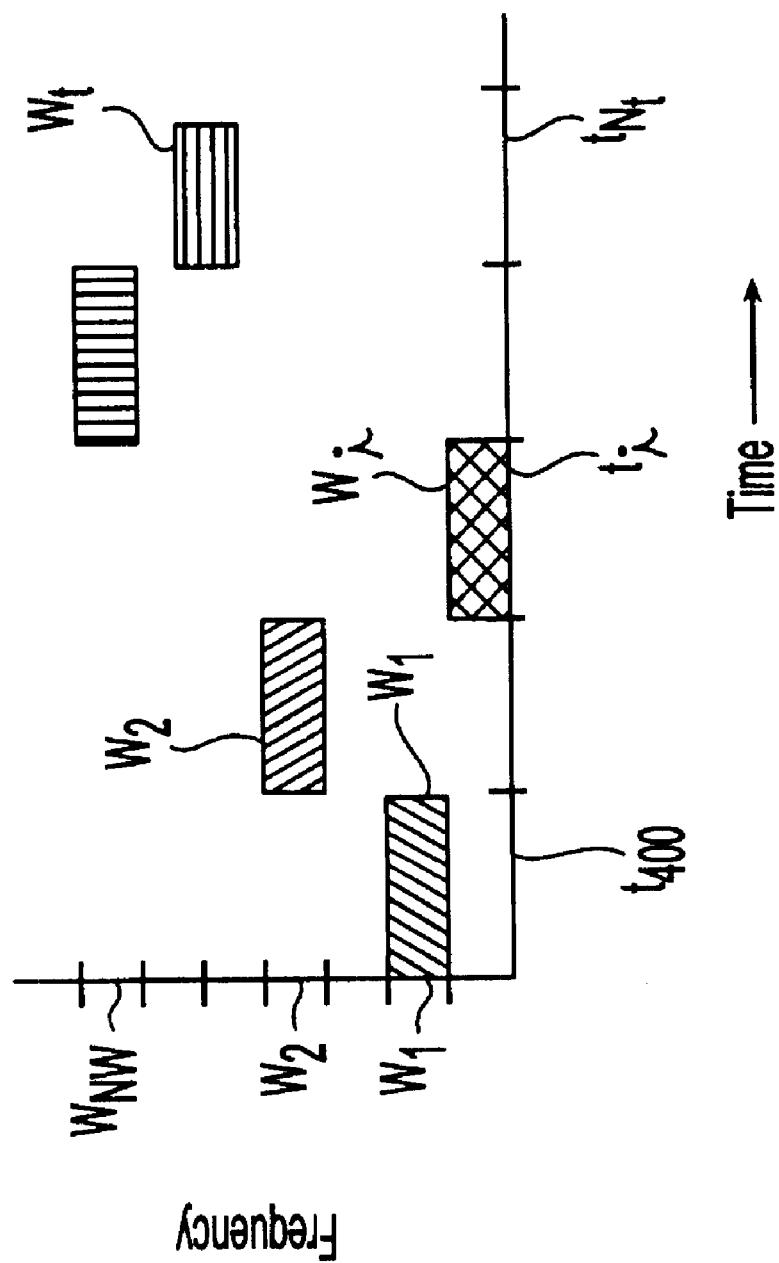
FIG. 9 shows a time-frequency plot of light output by a secure communication source the invention.

Referring to FIG. 9, a method for secure optical communication includes varying, as a function of time, a frequency of light encoding transmitted information. This secure optical communication system uses optical spread spectrum techniques. During a first time period $t_1$, information is encoded, such as by amplitude or, preferably, phase modulation of light having a frequency $\omega_1$. During a second time period $t_2$, information is encoded by modulation of light having a frequency $\omega_2$, which may be the same as or different from $\omega_1$. In general, information is encoded, during the ith time period, by modulation of light of a frequency $\omega_i$. The encoding step is repeated for a number $N_t$ times until all the information has been transmitted. At each successive time period, information may be encoded upon light having a frequency different or the same as a frequency of light encoded upon during the previous time segment. Thus, the information is encoded upon light having a number of frequencies $N_\omega$, which number may be less than $N_t$. The length of the time periods may be the same or may vary from period to period. The encoded information is transmitted to the receiver.

Light encoding the information upon the plurality of frequencies is transmitted, such as through free space or a fiber optic network to a receiver, where the information is decoded. Because the frequency of the transmitted light switches from frequency to frequency, one without knowledge of the transmission frequency sequence is prevented from decoding the transmitted information.

Figure 10:
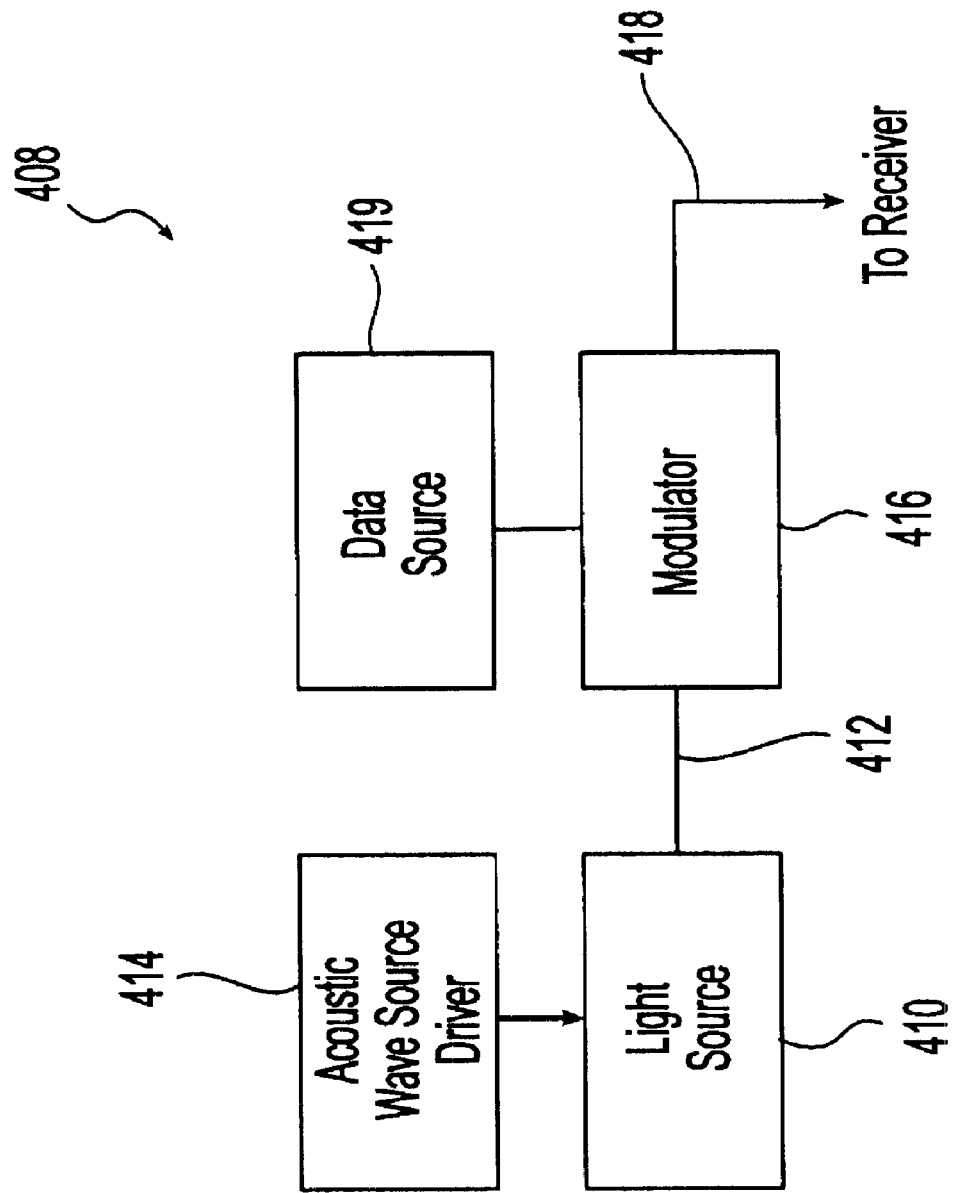
FIG. 10 shows a secure communication source of the invention suitable for preparing he time-frequency plot of FIG. 9.

Referring to FIG. 10, a transmitter 408 having a light source 410, which may be a light source in accordance with the present invention, is preferably used to provide the light which is modulated to encode the information. An acoustic wave source driver 414 varies an acoustic wave frequency of light source 410 to prepare an output beam 412 that switches between a plurality of frequencies as a function of time. Output beam 412 is received by a modulator 416, which modulates output beam 412 with information from a data source 419 to prepare a modulated output beam 418.

Modulator 416 is preferably a phase modulator, which prepares an optical signal that encodes information by, for example, phase shift keying, binary phase shift keying or quaternary phase shift keying. During the ith time period, phase modulator 416 modulates a phase of light having a frequency $\omega_i$ of output beam 412 to encode information from data source 419. During the jth time period, where j=i+1, phase modulator 416 modulates a phase of light having a frequency that may be the same as or different from $\omega_i$. Modulated output beam 418 is transmitted by transmitter 408 to be received and decoded by one having knowledge of the successive frequencies used to encode the information. The information may be decoded using, for example, homodyne or heterodyne detection.

Figure 11:
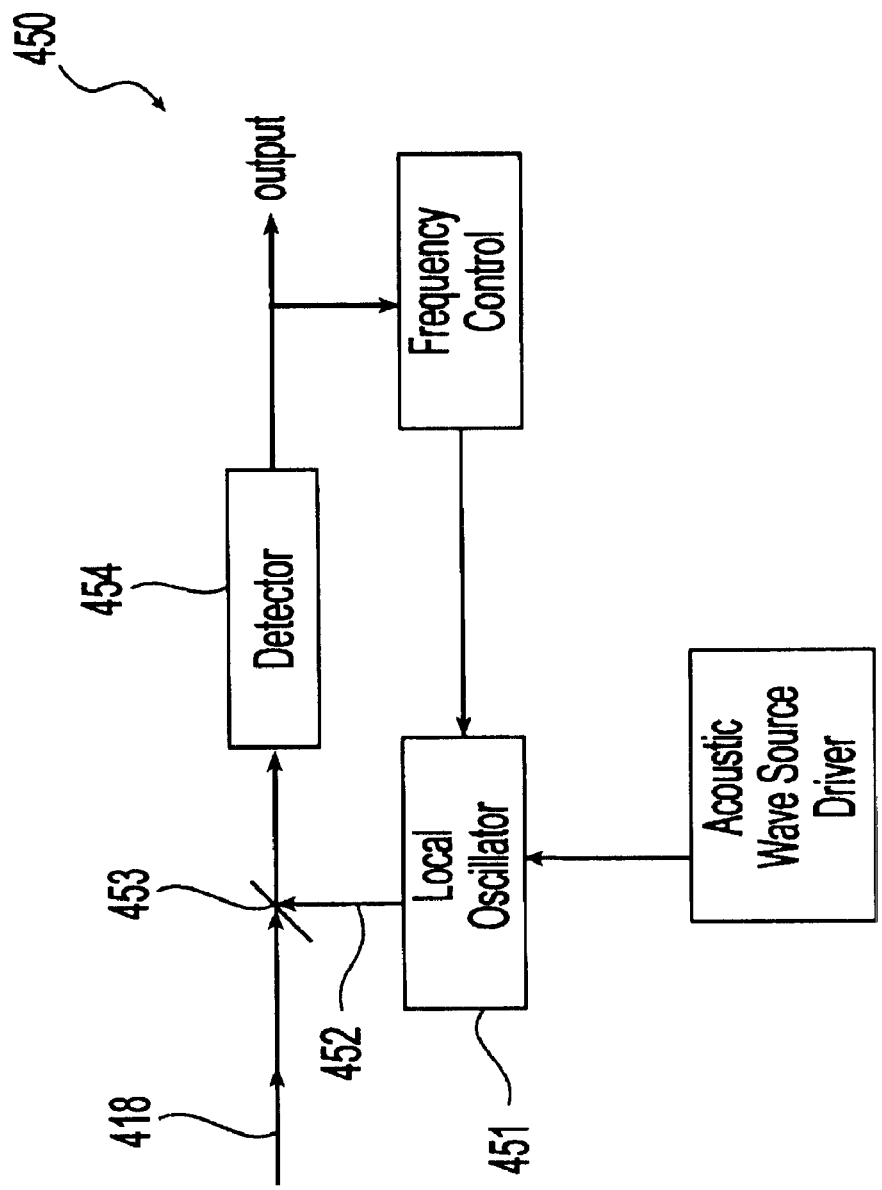
FIG. 11 shows a receiver of the invention for receiving information transmitted by the secure communication of FIG. 10.

Referring to FIG. 11, a heterodyne receiver 450 includes a local oscillator 451 providing an oscillator beam 452 having a variable frequency corresponding to the variable frequency of received output beam 418. Local oscillator 451 preferably comprises any of the light sources of the invention. Oscillator beam 452 and output beam 418 are combined 453 and detected by an optical detector 454. It is preferable that a frequency mismatch between beams 452 and 418 is less than about 1 GHz, such as less than about 250 MHz.

While the above invention has been described with reference to certain preferred embodiments, it should be kept in mind that the scope of the present invention is not limited to these. Thus, one skilled in the art may find variations of these preferred embodiments which, nevertheless, fall within the spirit of the present invention, whose scope is defined by the claims set forth below.

What is claimed is:

1. A light source, comprising:
   first, second, and third waveguides, at least one of the waveguides including a gain medium, the first and third waveguides defining an first offset coupling region, the first and second waveguides defining a second coupling region;
   a first acoustic wave source configured to subject the first offset coupling region to first acoustic waves, whereby light propagating along one of the first and third waveguides couples to the other waveguide; and
   a second acoustic wave source configured to subject the second coupling region to second acoustic waves, whereby light propagating along one of the first and third waveguides couples to the other waveguide.

2. The light source of claim 1, further comprising a first reflector optically associated with the second waveguide and a second reflector optically associated with the third waveguide, the first and second reflectors defining an optical cavity therebetween, the optical cavity including at least portions of each of the first, second, and third waveguides.

3. The light source of claim 1, wherein the second coupling region is an offset coupling region.

4. The light source of claim 3, wherein the first and second waveguides, in the first offset coupling region, and the first and third waveguides, in the second offset coupling region, are essentially free of crystalline material.

5. The light source of claim 1, further comprising a pump source configured to irradiate the gain medium with light.

6. The light source of claim 5, further comprising a multi-frequency light source configured to irradiate the gain medium with light having a plurality of spaced apart frequencies.

7. A light source, comprising:
   first, second, third, and fourth waveguides, at least one of the waveguides doped with a gain medium, the second, third and first waveguides defining a first coupling region pair, the second, third and fourth waveguides defining a second coupling region pair;
   a first acoustic wave source configured to subject the first coupling region pair to acoustic waves, whereby light propagating respectively along the second and third waveguides couples interferingly to the first waveguide; and
   a second acoustic wave source configured to subject the second coupling region pair to acoustic waves, whereby light propagating respectively along the second and third waveguides couples interferingly to the fourth waveguide.

8. The light source of claim 7, further comprising a first reflector optically associated with the first waveguide and a second reflector optically associated with the fourth waveguide, the first and second reflectors defining an optical cavity including at least portions of each of the first, second, third, and fourth waveguides.

9. The light source of claim 7, wherein the first coupling region pair comprises a pair of offset coupling regions.

10. The light source of claim 8, wherein the second coupling region pair comprises a pair of offset coupling regions.

11. The light source of claim 7, comprising a pump source configured to irradiate the gain medium with light.

12. A light source, comprising:
    first and second optical waveguides defining a first optical coupling region, at least one of the optical waveguides comprising a gain medium configured to generate light upon pumping; and
    a first acoustic wave source disposed to subject the first optical coupling region to acoustic waves having a longitudinal frequency $\omega_{AC1}$, whereby generated light propagating along one of the first and second waveguides couples to the other waveguide and propagates therealong, a frequency of the coupled light differing from a frequency of the generated light by about $\omega_{AC1}$.

13. The light source of claim 12, wherein the generated light comprises a plurality of frequencies and the coupled light consists essentially of one frequency.

14. The light source of claim 12, wherein the first and second waveguides are offset within the first optical coupling region.

15. The light source of claim 14, wherein the first and second optical waveguides have different refractive indices.

16. The light source of claim 14, wherein an index of refraction of each of the first and second waveguides is essentially independent of a polarization of light propagating therealong.

17. The light source of claim 14, wherein the first and second waveguides, in the first coupling region, are essentially free of crystalline material.

18. The light source of claim 12, further comprising:
    a third optical waveguide, the first and third optical waveguides defining a second optical coupling region;
    a second acoustic wave source disposed to subject the second optical coupling region to acoustic waves having a second longitudinal frequency $\omega_{AC2}$, whereby light propagating along one of the first and third waveguides with a frequency $\omega_1$ couples to the other of the first and third waveguides and propagates therealong with a frequency $\omega_2$ equal to about $\omega_1 \pm \omega_{AC1}$.

19. The light source of claim 18, wherein $\omega_{AC2} = \omega_{AC1}$.

20. The light source of claim 18, comprising an optical cavity, the optical cavity including the first and second coupling regions.

21. The light source of claim 20, wherein the light source is a laser.

22. A laser cavity, comprising:
    first and second optical waveguides, the first and second optical waveguides defining an offset coupling region therebetween, at least one of the optical waveguides comprising a gain medium configured to, upon pumping, generate light; and
    a first acoustic wave source to subject the first optical coupling region to acoustic waves having a first longitudinal acoustic wave vector $K_{AC1}$, whereby a first wave vector of light propagating one of the first and second waveguides differs from a second wave vector of light propagating along the other waveguide by an amount $K_{AC1}$.

23. The laser cavity of claim 22, further comprising:
    a third optical waveguide, the first and third optical waveguides defining a second coupling region therebetween;
    a second acoustic wave source disposed to subject the second optical coupling region to acoustic waves having a second longitudinal acoustic wave vector $K_{AC2}$, whereby light propagating along one of the first and third waveguides differs from light coupled to the other waveguide by an amount $K_{AC2}$.

24. The laser cavity of claim 23, wherein $K_{AC2} = K_{AC1}$.

25. The laser cavity of claim 23, wherein the second coupling region is an offset coupling region.

26. The light source of claim 22, wherein the first and second optical waveguides have different refractive indices.

27. The light source of claim 22, wherein an index of refraction of each of the first and second waveguides is essentially independent of a polarization of generated light propagating therealong.

28. The light source of claim 22, wherein the first and second waveguides, in the first coupling region, are essentially free of material that is birefringent at a wavelength of generated light propagating therealong.

29. The light source of claim 22, further comprising a multi-frequency light source disposed to irradiate one of the waveguides with light comprising a set of spaced apart frequencies, whereby the light source outputs light having a frequency corresponding to at least one of the spaced apart frequencies.

30. The light source of claim 29, wherein the discrete light source is a comb generator.

31. A method for producing light, comprising:
  pumping a gain medium of a first waveguide to obtain generated light having a generated light frequency;
  coupling generated light to a second waveguide by subjecting at least some of the generated light to acoustic waves having a first frequency $\omega_{AC1}$ to thereby provide second light having a second light frequency, wherein the second light frequency differs from the generated light frequency by an amount $\omega_{AC1}$; and
  outputting at least some of the second light.

32. The method of claim 31, wherein coupling the emitted light comprising moving the generated light laterally with respect to a propagation direction of the emitted light.

33. The method of claim 31, wherein coupling the generated light substantially maintains a polarization of the generated light.

34. The method of claim 31, wherein coupling the generated light comprises propagating the generated light through an essentially homogenous material.

35. The method of claim 31, wherein the generated light comprises stimulated emission.

36. The method of claim 31, further comprising encoding the second light with first information.

37. The method of claim 36, further comprising:
  subjecting at least some of the generated light to acoustic waves having a second frequency $\omega_{AC2}$ to thereby provide third light having a third light frequency, wherein the third light frequency differs from the generated light frequency by an amount $\omega_{AC2}$;
  outputting at least some of the third light; and
  encoding the third light with second information to thereby prepare an optical signal comprising second and third light.

38. The method of claim 36, wherein the first information is encoded after the second light is output.

39. An optical transmitter, comprising:
  an optical cavity comprising an optical coupling region between first and second waveguides;
  an acoustic wave source disposed to subject the optical coupling region to acoustic waves having an acoustic frequency $\omega_i$, whereby, upon coupling from one waveguide to the other, a frequency of light oscillating within the optical cavity changes by an amount of about $\pm\omega_i$, the optical cavity configured to output at least some of the oscillating light; and
  an acoustic wave source driver for changing the acoustic frequency $\omega_i$, wherein a frequency of light output by the optical cavity changes upon changing the acoustic frequency $\omega_1$, and
  wherein at least one of the first and second waveguides comprises a gain medium configured to generate light upon pumping, at least some of the generated light oscillating within the optical cavity.

40. The optical transmitter of claim 39, wherein in the acoustic wave source driver changes the acoustic frequency $\omega_i$ at a rate of at least about 100 kHz.

41. The optical transmitter of claim 39, wherein the acoustic frequency $\omega_i$ changes between at least about 10 frequencies.

42. The optical transmitter of claim 39, further comprising a modulator disposed to modulate light output by the optical cavity.

* * * * *